US008904170B2

(12) United States Patent
Brown et al.

(10) Patent No.: US 8,904,170 B2
(45) Date of Patent: *Dec. 2, 2014

(54) SYSTEM AND METHOD FOR ENABLING BULK RETRIEVAL OF CERTIFICATES

(75) Inventors: Michael Stephen Brown, Kitchener (CA); Neil Patrick Adams, Waterloo (CA); David Francis Tapuska, Waterloo (CA); Herbert Anthony Little, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,069

(22) Filed: Sep. 13, 2012

(65) Prior Publication Data

US 2013/0013917 A1 Jan. 10, 2013

Related U.S. Application Data

(63) Continuation of application No. 12/194,768, filed on Aug. 20, 2008, now Pat. No. 8,301,878, which is a continuation of application No. 10/913,693, filed on Aug. 9, 2004, now Pat. No. 7,430,663.

(51) Int. Cl.
*H04L 29/06* (2006.01)
*H04L 9/32* (2006.01)

(52) U.S. Cl.
CPC ........... *H04L 9/3263* (2013.01); *H04L 2209/80* (2013.01); *Y10S 707/99933* (2013.01)
USPC ............... 713/156; 713/176; 713/193; 726/5; 726/10; 707/707; 707/999.003

(58) Field of Classification Search
CPC . H04L 9/3263; H04L 2209/80; H04L 63/166; H04L 9/3273; Y10S 707/99933; G06F 21/10; G06F 21/52; G06F 21/6209; G06F 21/73
See application file for complete search history.

(56) References Cited

U.S. PATENT DOCUMENTS 6,233,572 B1 * 5/2001 Crawford et al. ...................... 1/1
6,377,946 B1 * 4/2002 Okamoto et al. ..................... 1/1
(Continued)

FOREIGN PATENT DOCUMENTS

CA   2477026   7/2011
WO   WO 02/101580   * 12/2002

OTHER PUBLICATIONS

Chadwick et al. "Modifying LDAP to Support S.509-based PKIs" University of Salford, pp. 1-8.*

(Continued)

*Primary Examiner* — Shewaye Gelagay
(74) *Attorney, Agent, or Firm* — Bereskin & Parr LLP/S.E.N.C.R.L., s.r.l.

(57) ABSTRACT

A system and method for searching and retrieving certificates, which may be used in the processing of encoded messages. In one embodiment, a certificate synchronization application is programmed to perform certificate searches by querying one or more certificate servers for all of the certificates on those certificate servers. If all of the certificates on a certificate server cannot be successfully retrieved using a single search query, due to a search quota on the certificate server being exceeded for example, the search is re-performed through multiple queries, each corresponding to a narrower subsearch. Embodiments described herein enable large amounts of certificates to be automatically searched for and retrieved from certificate servers, thereby minimizing the need for users to manually search for individual certificates.

20 Claims, 8 Drawing Sheets

(56) References Cited

U.S. PATENT DOCUMENTS

| | | | |
|---|---|---|---|
| 6,633,873 | B1 | 10/2003 | Nakamura |
| 7,213,047 | B2 | 5/2007 | Yeager et |
| 7,254,608 | B2 | 8/2007 | Yeager et al. |
| 7,430,663 | B2 | 9/2008 | Brown et al. |
| 8,301,878 | B2 | 10/2012 | Brown et al. |
| 2003/0196084 | A1 | 10/2003 | Okereke et al. |
| 2004/0030681 | A1 | 2/2004 | Shannon et al. |
| 2004/0133775 | A1* | 7/2004 | Callas et al. .................. 713/153 |
| 2005/0055372 | A1* | 3/2005 | Springer et al. ........... 707/104.1 |

OTHER PUBLICATIONS

U.S. Appl. No. 10/913,693, "System and Method of Enabling Bulk Retrieval of Certificates", filed Aug. 9, 2004, issued to patent as Patent No. 7,430,663.
Response and Terminal Disclaimer dated Jul. 29, 2011, U.S. Appl. No. 12/194,768.
RCE dated Jan. 6, 2012, U.S. Appl. No. 12/194,768.
Office Action dated May 6, 2011, U.S. Appl. No. 12/194,768.
Office Action dated Oct. 20, 2011, U.S. Appl. No. 12/194,768.
Supplemental Notice of Allowance dated Sep. 14, 2012, U.S. Appl. No. 12/194,768.
Notice of Allowance and Examiner Initiated Interview Summary dated Jul. 19, 2012, U.S. Appl. No. 12/194,768.
U.S. Appl. No. 12/194,768, "System and Method for Enabling Bulk Retrieval of Certificates", filed Aug. 20, 2008, issued to patent as Patent No. 8,301,878
Response dated Dec. 12, 2011, U.S. Appl. No. 12/194,768.
Advisory Action dated Dec. 27, 2011, U.S. Appl. No. 12/194,768.
Amendment After Allowance dated Sep. 11, 2012, U.S. Appl. No. 12/194,768.
Applicant Interview Summary dated Jul. 20, 2012, U.S. Appl. No. 12/194,768.
Canadian Office Action dated May 5, 2009, CA Application No. 2,477,026.
Canadian Office Action dated Mar. 16, 2010, CA Application No. 2,477,026.
Canadian Notice of Allowance dated Mar. 29, 2011, CA Application No. 2,477,026.

* cited by examiner

SYSTEM AND METHOD FOR ENABLING BULK RETRIEVAL OF CERTIFICATES

CROSS REFERENCE TO RELATED APPLICATION

This application is a continuation of U.S. patent application Ser. No. 12/194,768, filed on Aug. 20, 2008, now issued as U.S. Pat. No. 8,301,878, which is a continuation of U.S. patent application Ser. No. 10/913,693, filed on Aug. 9, 2004, now issued as U.S. Pat. No. 7,430,663. The entire contents of application Ser. No. 12/194,768, and application Ser. No. 10/913,693 are hereby incorporated by reference.

TECHNICAL FIELD

Embodiments described herein relate generally to the processing of messages, such as e-mail messages, and more specifically to a system and method for searching and retrieving certificates used in the processing of encoded messages.

BACKGROUND

Electronic mail ("e-mail") messages may be encoded using one of a number of known protocols. Some of these protocols, such as Secure Multiple Internet Mail Extensions ("S/MIME") for example, rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. The authenticity of public keys used in the encoding of messages is validated using certificates. In particular, if a user of a computing device wishes to encrypt a message before the message is sent to a particular individual, the user will require a certificate for that individual. That certificate will typically comprise the public key of the individual, as well as other identification-related information.

If the requisite certificate for the intended recipient is not already stored on the user's computing device, the certificate must first be retrieved. Searching for and retrieving a certificate for a specific recipient is a process that generally involves querying a certificate server by having the user manually enter the name and/or e-mail address of the intended recipient in a search form displayed on the computing device. Certificates located in the search are then temporarily downloaded to the computing device for consideration, and a list of located certificates may be displayed to the user. Selected certificates in the list may then be manually identified by a user for storage in a non-volatile store of the computing device, for potential future use.

Many organizations set up their own certificate servers that contain all of the certificates that have been issued to people in the organization who are able to send and receive encoded messages. If an individual in the organization plans to communicate with other individuals in the organization, the certificates of these other individuals will potentially need to be obtained. Manually searching for certificates issued to particular individuals in an organization, as they become needed, can be inconvenient and time-consuming. Furthermore, manual searching for certificates may be particularly cumbersome if the computing device on which the certificate searches are initiated is small in size (e.g. a mobile device). It might not also be clear who is enabled to send and receive encoded messages within an organization, and therefore some attempted certificate searches may not return the desired results, if any results are returned at all.

SUMMARY

Embodiments described herein are generally directed to a system and method for searching and retrieving certificates that automates at least some of the tasks typically performed manually by users in known techniques, and which may be employed by individuals within an organization to more efficiently exchange encoded messages with other individuals in the organization that are able to do so. More specifically, embodiments described herein may be employed to retrieve large numbers of certificates from one or more certificate servers.

In one broad aspect, there is provided a method for searching and retrieving certificates comprising: performing a search on each of one or more certificate servers for a respective plurality of certificates, wherein at least one query is submitted to the certificate server to request retrieval of the respective plurality of certificates; wherein said performing comprises, for each certificate server, dividing the respective search to be performed on the certificate server into a plurality of subsearches, initiating the subsearches recursively on the certificate server, wherein at least one query is submitted to the certificate server for each subsearch, wherein the certificate server returns at least a subset of the respective plurality of certificates as a collective result of the subsearches of the respective search, and downloading the at least a subset of the respective plurality of certificates to the computing device.

In another broad aspect, the method is performed by a certificate synchronization application executing and residing on the computing device upon initiation of the search by a user.

In another broad aspect, the method further comprises: transmitting at least a subset of certificates downloaded to the computing device to a mobile device; and storing the at least a subset of certificates in one or more certificate stores on the mobile device In another broad aspect, the method further comprises: generating a list of certificates identifying one or more certificates downloaded to the computing device; displaying the list of certificates identifying one or more certificates downloaded to the computing device; and receiving user selections of one or more selected certificates identified in the list; wherein the at least a subset of certificates transmitted to the mobile device comprises the one or more selected certificates.

In another broad aspect, the method further comprises filtering out duplicate downloaded certificates prior to storing the at least a subset of certificates in the one or more certificate stores on the mobile device.

In another broad aspect, the dividing substep comprises dividing the respective search into subsearches, each subsearch for searching certificates issued to names beginning with one of a plurality of prefixes, such as a letter of the alphabet, for example.

BRIEF DESCRIPTION OF THE DRAWINGS

For a better understanding of embodiments described herein, and to show more clearly how it may be carried into effect, reference will now be made, by way of example, to the accompanying drawings in which.

DETAILED DESCRIPTION

Some embodiments described herein make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
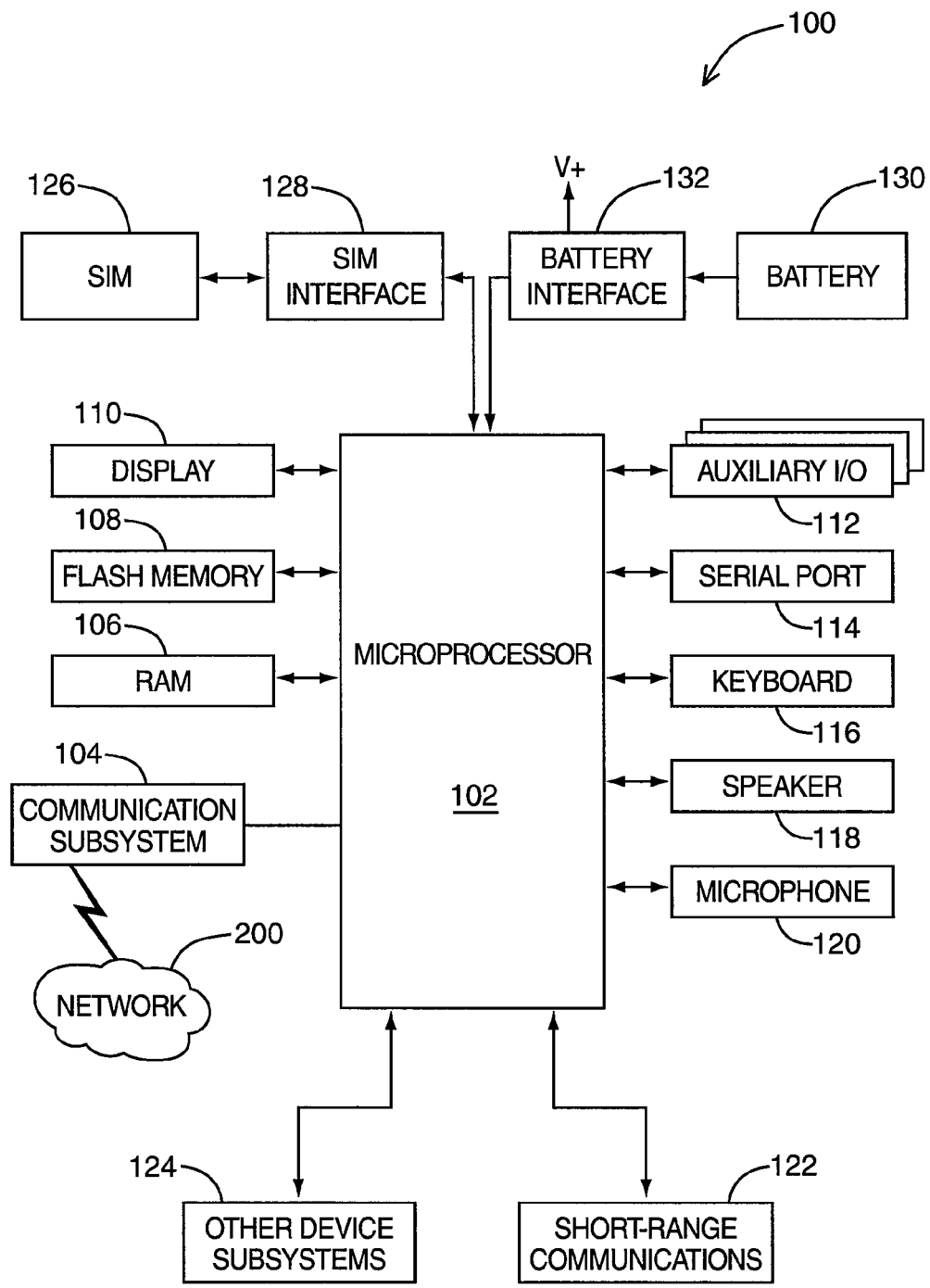
FIG. 1 is a block diagram of a mobile device in one example implementation.
Figure 2:
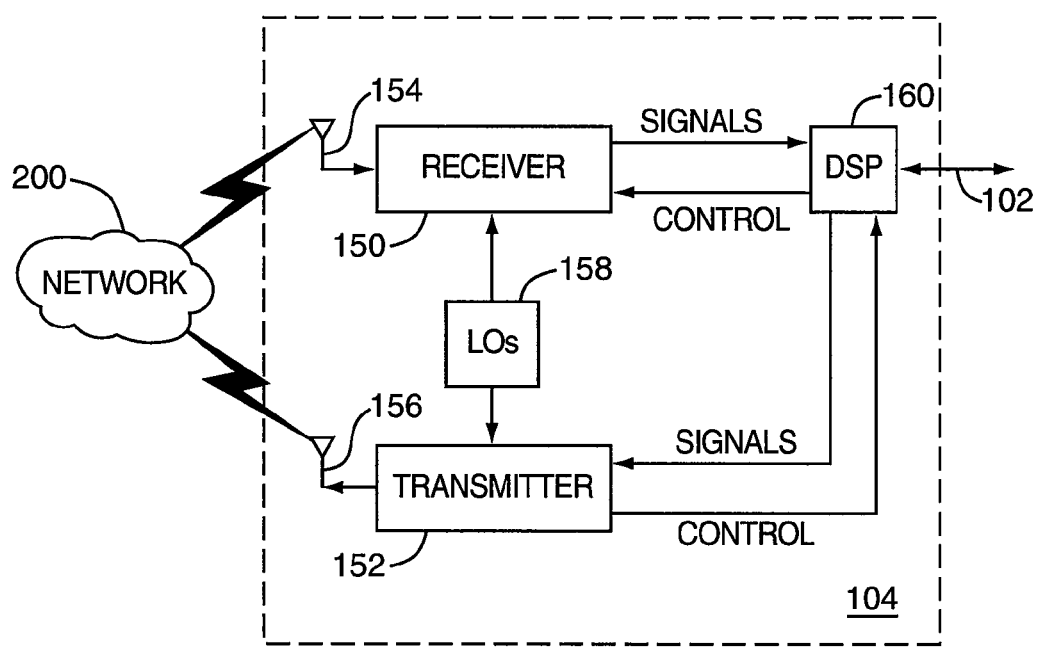
FIG. 2 is a block diagram of a communication subsystem component of the mobile device of FIG. 1.
Figure 3:
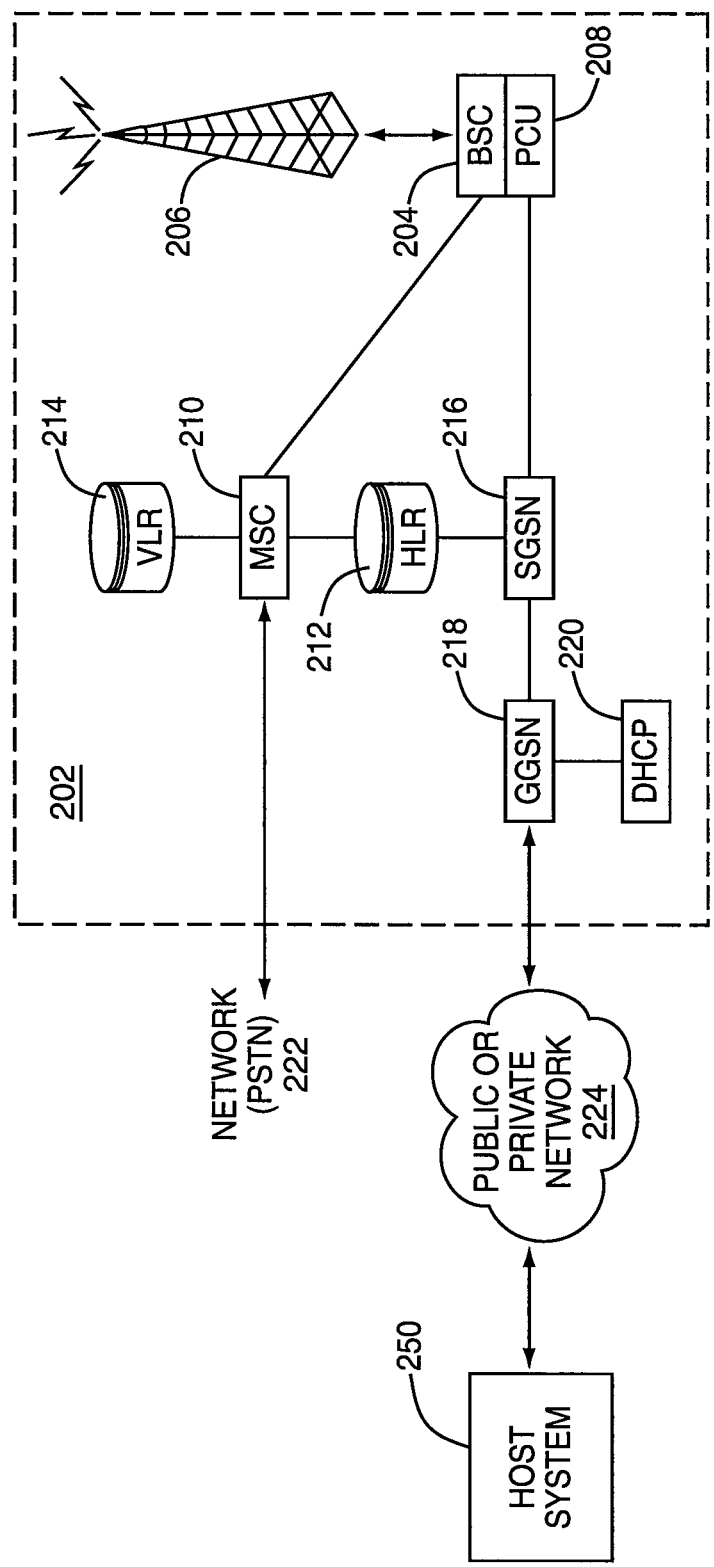
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that embodiments described herein may use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
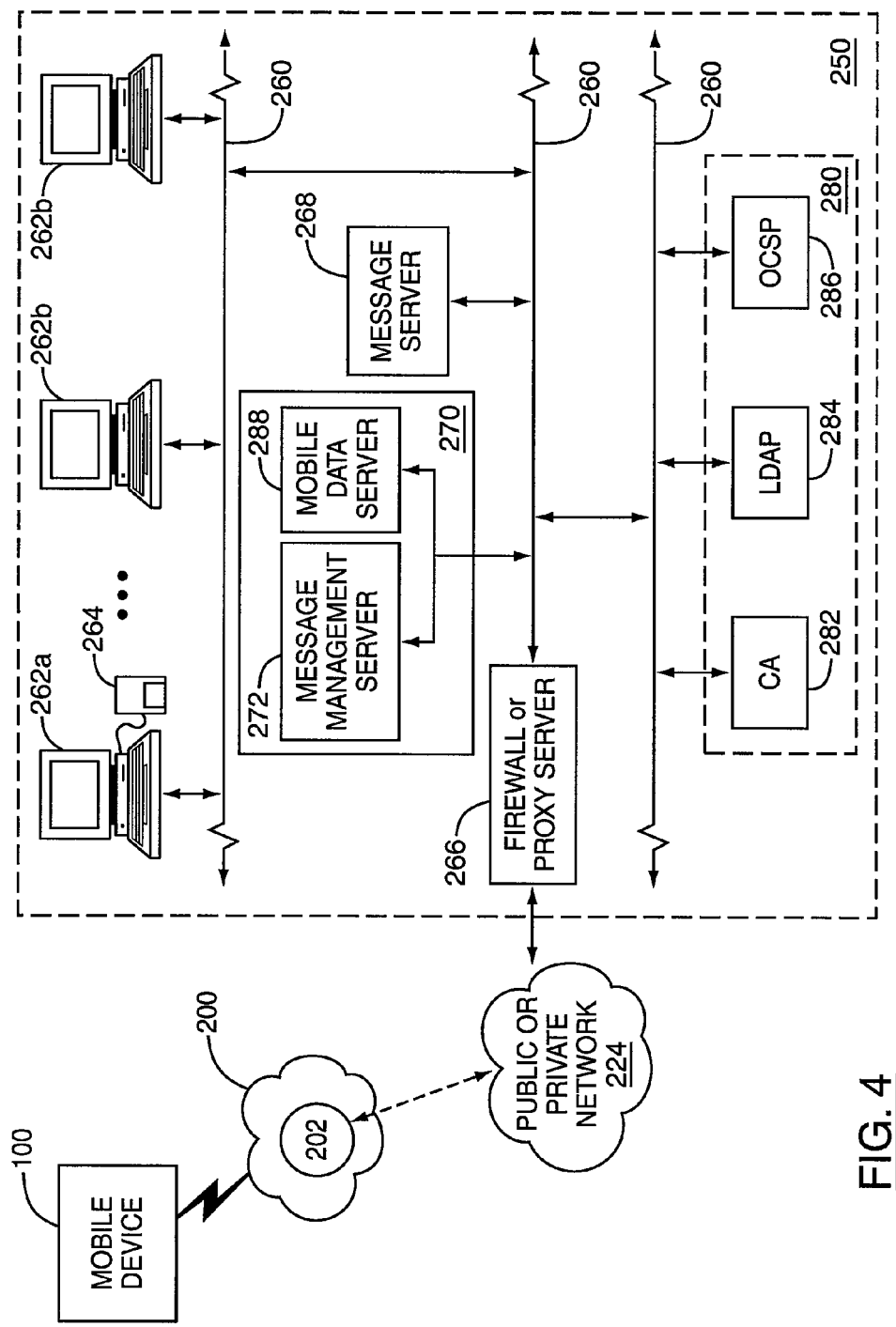
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

Embodiments described herein relate generally to the processing of messages, such as e-mail messages, and some embodiments relate generally to the communication of such messages to and from mobile device 100. Accordingly, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into P-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

Embodiments described herein relate generally to the processing of encoded messages, such as e-mail messages that are encrypted and/or signed. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and protects data integrity and privacy from the time an originator of a message sends a message until it is decoded and read by the message recipient. Other known standards and protocols may be employed to facilitate secure message communication, such as Pretty Good Privacy™ (PGP), OpenPGP, and others known in the art.

Secure messaging protocols such as S/MIME rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature is a digest of the message (e.g. a hash of the message) encrypted using the sender's private key, which can then be appended to the outgoing message. To verify the signature of the message when received, the recipient uses the same technique as the sender (e.g. using the same standard hash algorithm) to obtain a digest of the received message. The recipient also uses the senders public key to decrypt the digital signature, in order to obtain what should be a matching digest for the received message. If the digests of the received message do not match, this suggests that either the message content was changed during transport and/or the message did not originate from the sender whose public key was used for verification. By verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

Figure 5:
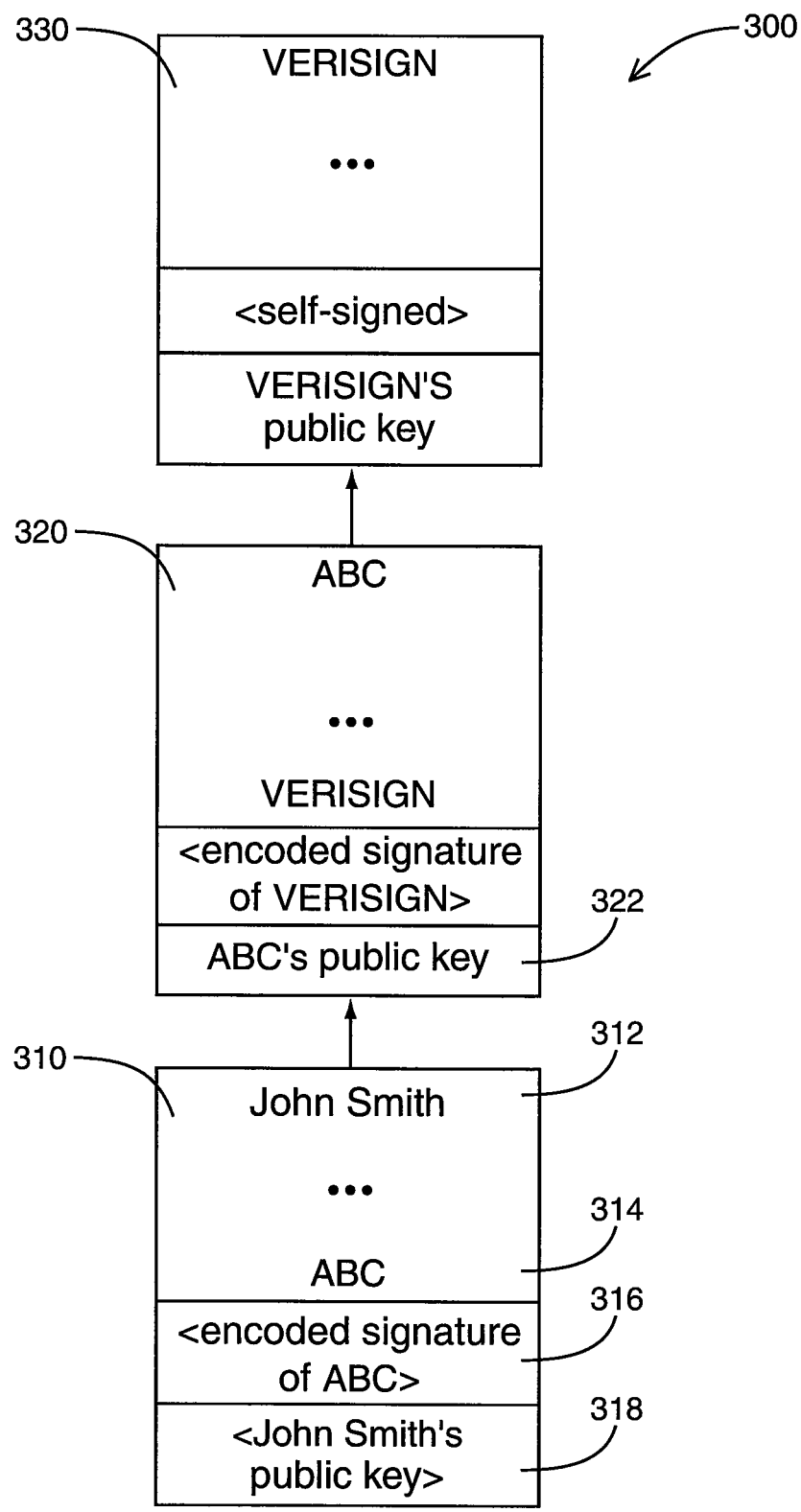
FIG. 5 is a block diagram showing an example of a certificate chain.

Consider FIG. 5, in which an example certificate chain 300 is shown. Certificate 310 issued to "John Smith" is an example of a certificate issued to an individual, which may be referred to as an end entity certificate. End entity certificate 310 typically identifies the certificate holder 312 (i.e. John Smith in this example) and the issuer of the certificate 314, and includes a digital signature of the issuer 316 and the certificate holder's public key 318. Certificate 310 will also typically include other information and attributes that identify the certificate holder (e.g. e-mail address, organization name, organizational unit name, location, etc.). When the individual composes a message to be sent to a recipient, it is customary to include that individual's certificate 310 with the message.

For a public key to be trusted, its issuing organization must be trusted. The relationship between a trusted CA and a user's public key can be represented by a series of related certificates, also referred to as a certificate chain. The certificate chain can be followed to determine the validity of a certificate.

For instance, in the example certificate chain 300 shown in FIG. 5, the recipient of a message purported to be sent by John Smith may wish to verify the trust status of certificate 310 attached to the received message. To verify the trust status of certificate 310 on a recipient's computing device (e.g. computer 262a of FIG. 4) for example, the certificate 320 of issuer ABC is obtained, and used to verify that certificate 310 was indeed signed by issuer ABC. Certificate 320 may already be stored in a certificate store on the computing device, or it may need to be retrieved from a certificate source (e.g. LDAP server 284 of FIG. 4 or some other public or private LDAP server). If certificate 320 is already stored in the recipient's computing device and the certificate has been designated as trusted by the recipient, then certificate 310 is considered to be trusted since it chains to a stored, trusted certificate.

However, in the example shown in FIG. 5, certificate 330 is also required to verify the trust of certificate 310. Certificate 330 is self-signed, and is referred to as a "root certificate". Accordingly, certificate 320 may be referred to as an "intermediate certificate" in certificate chain 300; any given certificate chain to a root certificate, assuming a chain to the root certificate can be determined for a particular end entity certificate, may contain zero, one, or multiple intermediate certificates. If certificate 330 is a root certificate issued by a trusted source (from a large certificate authority such as Verisign or Entrust, for example), then certificate 310 may be considered to be trusted since it chains to a trusted certificate. The implication is that both the sender and the recipient of the message trust the source of the root certificate 330. If a certificate cannot be chained to a trusted certificate, the certificate may be considered to be "not trusted".

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

Standard e-mail security protocols typically facilitate secure message transmission between non-mobile computing devices (e.g. computers 262a, 262b of FIG. 4; remote desktop devices). Referring again to FIG. 4, in order that signed messages received from senders may be read from mobile device 100 and encrypted messages be sent to those senders, mobile device 100 is adapted to store certificates and associated public keys of other individuals. Certificates stored on a user's computer 262a will typically be downloaded from computer 262a to mobile device 100 through cradle 264, for example.

Certificates stored on computer 262a and downloaded to mobile device 100 are not limited to certificates associated with individuals but may also include certificates issued to CAs, for example. Certain certificates stored in computer 262a and/or mobile device 100 can also be explicitly designated as "trusted" by the user. Accordingly, when a certificate is received by a user on mobile device 100, it can be verified on mobile device 100 by matching the certificate with one stored on mobile device 100 and designated as trusted, or otherwise determined to be chained to a trusted certificate.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key is preferably exchanged between the computer 262a and mobile device 100 so that the user may share one identity and one method for accessing messages.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

Figure 6:
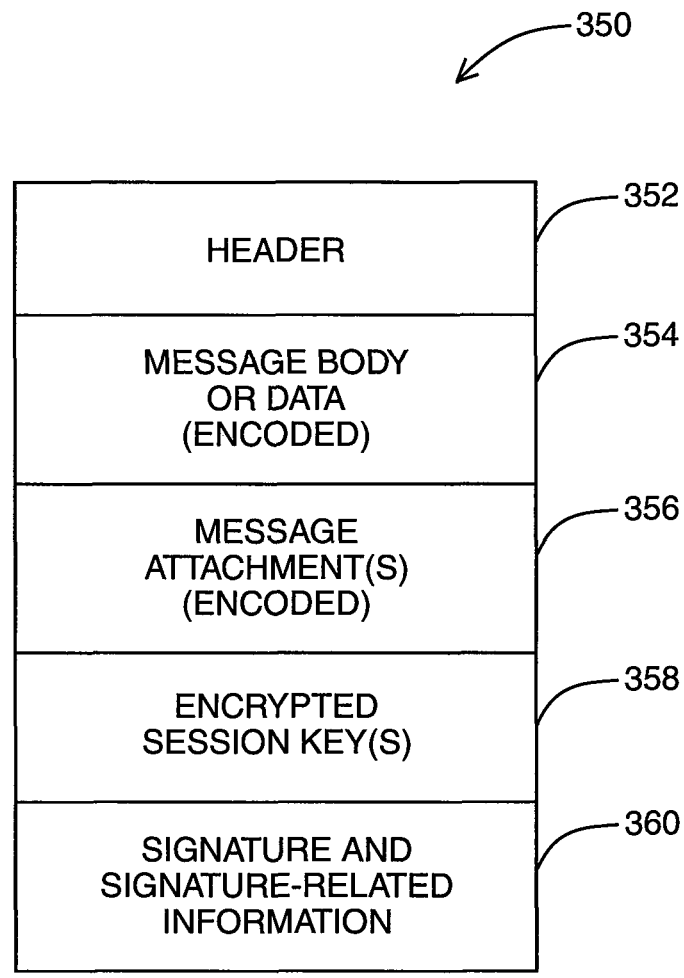
FIG. 6 is a block diagram illustrating components of an example of an encoded message.

Referring now to FIG. 6, a block diagram illustrating components of an example of an encoded message, as may be received by a message server (e.g. message server 268 of FIG. 4), is shown generally as 350. Encoded message 350 typically includes one or more of the following: a header portion 352, an encoded body portion 354, optionally one or more encoded attachments 356, one or more encrypted session keys 358, and signature and signature-related information 360. For example, header portion 352 typically includes addressing information such as "To", "From", and "CC" addresses, and may also include message length indicators, and sender encryption and signature scheme identifiers, for example. Actual message content normally includes a message body or data portion 354 and possibly one or more attachments 356, which may be encrypted by the sender using a session key. If a session key was used, it is typically encrypted for each intended recipient using the respective public key for each recipient, and included in the message at 358. If the message was signed, a signature and signature-related information 360 are also included. This may include the sender's certificate, for example.

The format for an encoded message as shown in FIG. 6 is provided by way of example only, and persons skilled in the art will understand that embodiments described herein will be applicable to encoded messages of other formats. Depending on the specific messaging scheme used, components of an encoded message may appear in a different order than shown in FIG. 6, and an encoded message may include fewer, additional, or different components, which may depend on whether the encoded message is encrypted, signed or both.

Embodiments described herein are generally directed to a system and method for searching and retrieving certificates that automates at least some of the tasks typically performed manually by users in known techniques for searching certificates, and provide means for large numbers of certificates to be retrieved from one or more certificate servers.

Many certificate servers (e.g. LDAP servers, such as LDAP server 284 of FIG. 4) are configured to impose limits on the number of certificates that will be located on and retrieved from the server in the processing of a given search query. For example, this may be done to prevent a search from inadvertently returning too many results if the query used was, perhaps unintentionally, defined too broadly. Typically, a search is performed on a certificate server to locate a few, select certificates for specific individuals.

However, in certain situations, it may be desirable to obtain a large number, if not all of the certificates, particularly end entity certificates, which are stored on one or more specific certificate servers. For example, many organizations set up their own LDAP servers to store certificates issued to people within the organization who are able (or set up) to send and receive encoded messages. If the organization is not too large, some individuals within the organization may wish to download most or all of the end entity certificates on the organization's LDAP server, and store them on that individual's computing device for future use. In the event that a particular certificate is subsequently needed to encode or decode a message exchanged (or to be exchanged) with another individual in the same organization, it is likely that the requisite certificate has already been retrieved and stored, and a manual search for and retrieval of the certificate from the LDAP server may not be required.

In one example embodiment, a certificate synchronization application is provided on a user's computing device. The certificate synchronization application is programmed to allow users to initiate certificate searches of one or more certificate servers and retrieve large numbers of certificates, if not all of the certificates, on those certificate servers in accordance with one of the methods in at least one example embodiment, as may be described with reference to the remaining Figures.

In one example embodiment, the certificate synchronization application executes and resides on a user's desktop computer (e.g. computer 262a of FIG. 4) to which a cradle (e.g. cradle 264 of FIG. 4) for a mobile device (e.g. mobile device 100 of FIG. 4) is connected. However, in variant embodiments, the certificate synchronization application may execute and reside on a desktop computer not equipped with a cradle for a mobile device, or on some other computing device. For example, the certificate synchronization application may execute and reside on a mobile device, which may have direct access to certificate servers (e.g. through mobile data server 288 of FIG. 4). By way of further example, the certificate synchronization application need not be executing on the same computing device to which certificates would typically be downloaded. For example, the certificate synchronization application may execute on a central server, such as a message management server (e.g. message management server 272 of FIG. 4) or message server (e.g. message server 268 of FIG. 4), for example. Moreover, the certificate synchronization application need not be a stand-alone application, and the functions of the certificate synchronization application described herein may be integrated with the functions of some other application, residing and executing on a computing device such as a desktop computer, a mobile device, a message management server, a message server, or some other computing device.

Figure 7A:
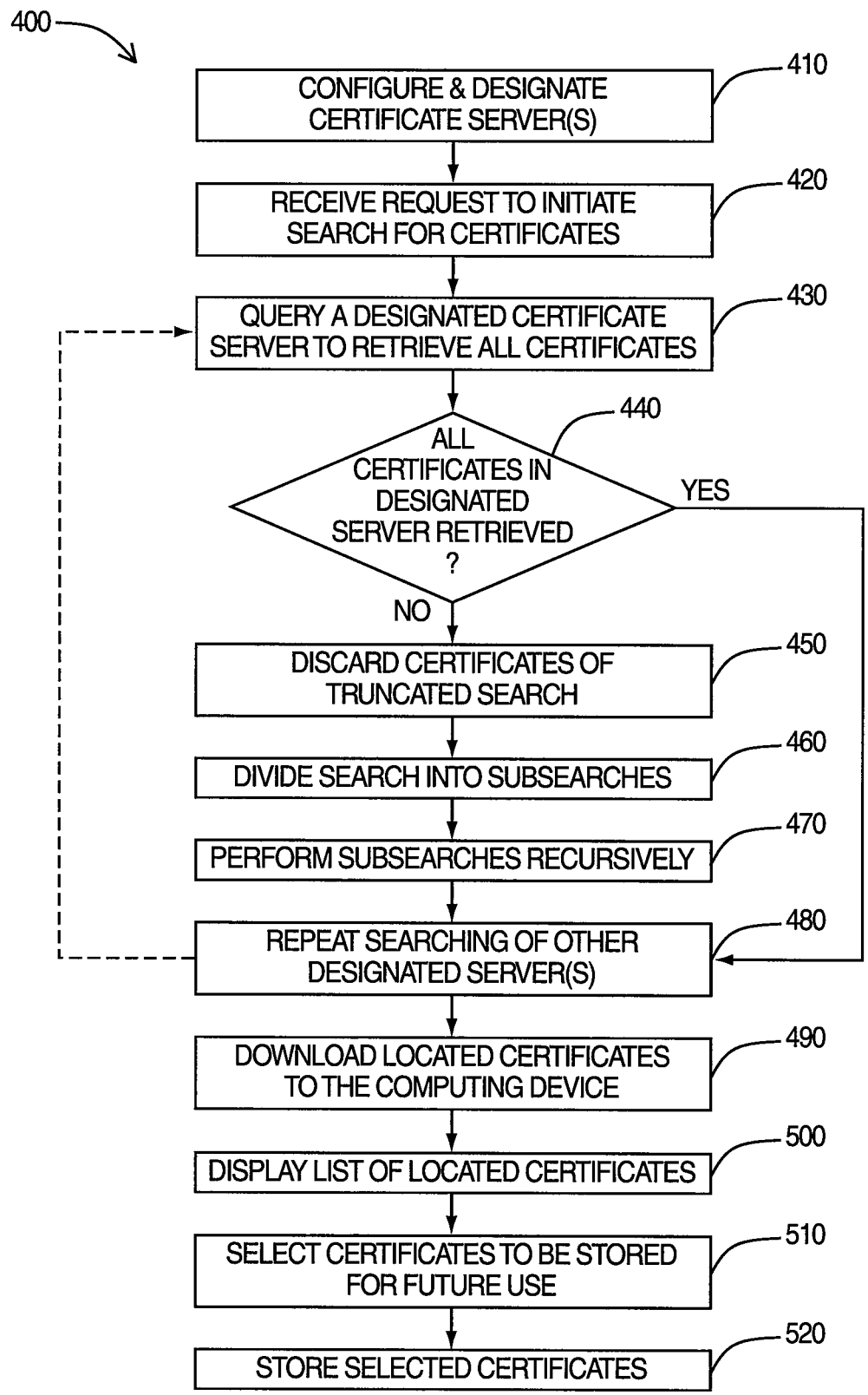
FIG. 7A is a flowchart illustrating steps in a method of searching and retrieving certificates in an example embodiment.

Referring to FIG. 7A, a flowchart illustrating steps in a method of searching and retrieving certificates in an example embodiment is shown generally as 400. The method facilitates at least partial automation of a pre-loading of certificates, to minimize the need for a user to manually search for a certificate for individuals whose certificates are stored on specific certificate servers. These certificate servers may be maintained by an organization to which the user belongs, for example.

In one example embodiment, at least some of the steps of the method are performed by a certificate synchronization application that executes and resides on a desktop computer. In variant embodiments, the certificate synchronization application may be residing and executing on a computing device such as a mobile device, a message management server, a message server, or some other computing device.

At step 410, one or more certificate servers (e.g. LDAP server 284 of FIG. 4) that will be used for certificate searches are configured for access. Of those configured certificate servers, one or more certificate servers may be designated for certificate searching in accordance with an example embodiment.

Typically, information required to configure a certificate server may include, for example, a host name, a host address or uniform resource locator (URL), a port number (e.g. for LDAP servers), a default base query, a query limit (e.g. user-defined, independent of the limit that the server itself may impose), and/or an indication of whether certificate information is to be compressed for transmission. In one implementation, such configuration information can be input by a user, and default values for certain inputs may be set in the certificate synchronization application. In other implementations, such configuration information may already be pre-defined in the certificate synchronization application, possibly by an IT administrator in accordance with an IT policy. Still other implementations may permit some configuration information to be input or modified by users, while not permitting other configuration information to be user-modified.

Similarly, in one implementation, the certificate synchronization application may permit users to manually designate specific certificate servers that will be queried and searched in accordance with an example embodiment. In other implementations, the certificate synchronization application may automatically designate certain pre-identified specific certificate servers to be searched, possibly as directed by an IT administrator in accordance with an IT policy. Still other implementations may permit some degree of user configuration, by allowing a user to designate specific certificate servers but only from a set defined by an IT administrator, in accordance with an IT policy, for example.

At step 420, a request is received by the certificate synchronization application from the user to initiate a search for all certificates in the servers designated at step 410.

At step 430, the certificate synchronization application searches for certificates by automatically querying a designated certificate server, attempting to locate and retrieve all of the certificates stored on each server. For example, certain certificate servers will accept blank queries or queries employing some "wild card" type search indicator, and return all certificates stored on the server.

In this example embodiment, the queries are defined to return end entity certificates only. However, in variant embodiments, the queries may be defined to return other types of certificates (e.g. root and/or intermediate certificates issued to CAs), or some combination of different types of certificates.

Depending on the particular certificate server, if all of the certificates on the certificate server cannot be successfully located and retrieved, possibly due to a limit on the number of potential search results being exceeded (also referred to herein in the specification and claims as a "quota"), the certificate server may terminate the search and issue an error indicator, and return no results or return a limited number of results.

If some, but not all certificates could be located and retrieved at step 430 as determined at step 440, these certificates (i.e. the truncated search results) may be discarded at step 450 to avoid potential duplication that might arise as a result of further searching. However, step 450 is optional, and the removal of any duplicates may be deferred, after searching of the designated certificate server has been completed, for example.

If at step 440, it is determined that not all certificates stored on the designated server searched at step 430 were successfully located and retrieved, a "divide-and-conquer" approach may then be employed. Such an approach to the searching of certificates on certificate servers may not have been considered by persons skilled in the art, since quotas on the number of search results that can be obtained from a search of a certificate server are typically established specifically to prevent or at least impede such a mass (or "bulk") downloading of certificates. Accordingly, a divide-and-conquer technique is used to overcome the search limitations imposed by such quotas.

Generally, algorithms that follow a divide-and-conquer approach break a particular problem into several subproblems that are similar to the original problem but smaller in size, solve the subproblems recursively, and then combine these solutions to create a solution to the original problem. More specifically, the divide-and-conquer paradigm generally involves three steps at each level of the recursion:

divide the problem into a number of subproblems;
    solve each of the subproblems recursively ("conquer"); if the subproblem sizes are small enough, however, then the subproblems can be solved in a straightforward manner; and
    combine the solutions to the subproblems to obtain the solution for the original problem.

In the context of embodiments described herein, the problem to be solved relates to the searching and retrieval of all of the certificates from the designated certificate server(s). If at step 440, it is determined that not all certificates stored on the designated certificate server searched at step 430 were successfully located and retrieved, the search is divided into two or more narrower searches ("subsearches") at step 460. The subsearches are defined so that the results of the two subsearches can be combined to obtain what would have resulted from the search had the search been successful in the first instance.

The subsearches are then performed recursively at step 470 through corresponding queries of the designated certificate server made by the certificate synchronization application; if a particular subsearch does not successfully locate all of the certificates associated with that subsearch (e.g. due to a search quota being exceeded), that subsearch can be divided into a further level of subsearches. If any of the subsearches at that further level are not successful, those subsearches can each be divided into yet another level of subsearches, and so on, until search results for each subsearch is obtained, which can then be combined to produce the overall search results.

In a variant embodiment, a limit on the number of levels of recursion that may be permitted with respect to the search may be defined and enforced by the certificate synchronization application. This recursion level limit may be established by an IT administrator, in accordance with an IT policy, for example.

The form of the subsearches into which a search may be divided can differ in different implementations. For example, if a certificate server permits range-type queries, a search of all certificates may be divided into a first subsearch for certificates issued to individuals with a last name beginning with a letter from A-M and a second subsearch for certificates issued to individuals with a last name beginning with N-Z; each of these subsearches, if unsuccessful, may be further divided into smaller subsearches (e.g. A-M→A-G+H-M, N-Z→N-S+T-Z), and so on. Any truncated results of unsuccessful subsearches may be optionally discarded. For any given search or subsearch, the search or subsearch can be divided into two, three, or more subsearches at any given level of recursion, and the scopes of the subsearches within a particular level or between different levels of recursion can differ. Subsearches may be based on any of a number of appropriate attributes, which can be used to query a given certificate server, including last names, first names, e-mail addresses, employee numbers, and organizational unit identifiers, for example. It will be understood by persons skilled in the art that many different variations of divide-and-conquer type algorithms may be employed.

At step 480, if not all designated certificate servers have been searched, searching is performed on a designated certificate server that has not yet been searched. Accordingly, steps of method 400 may be repeated from step 430 until all designated certificate servers have been searched.

At step 490, located certificates resulting from the searches of the designated certificate servers are downloaded to the computing device. In this embodiment, these certificates are stored temporarily on the computing device, and only a subset of certificates as selected by a user is stored for future use. This allows the user to filter the search results and discard unwanted or irrelevant certificates. However, in a variant implementation, all located certificates may be automatically stored for future use on the computing device at step 490 without being filtered by the user. In this case, the remaining steps of method 400 would not be performed.

At step 500, a list of located certificates downloaded to the computing device at step 490 is displayed to the user.

At step 510, a subset of certificates may be selected by the user from the list displayed at step 500, to be stored for future use.

At step 520, the certificates selected at step 510 are stored in a certificate store on the computing device.

In a variant embodiment, the certificates selected at step 510 may be stored on a (e.g. desktop) computer, and at least a subset of those selected certificates may then be downloaded to a mobile device for storage in a certificate store on the mobile device. Certificate downloading to the mobile device can be facilitated through a physical coupling to the computing device (e.g. through cradle 264 of FIG. 4) or through a wireless connection, for example. In another variant embodiment, the selected certificates or a subset thereof may be stored in a certificate store on the mobile device, but not in a certificate store on the computing device.

In a variant embodiment, method 400 further comprises a step of filtering out duplicate certificates that have been downloaded to the computing device. The list of located certificates displayed at step 500 may be generated to reflect the filtered results.

Figure 7B:
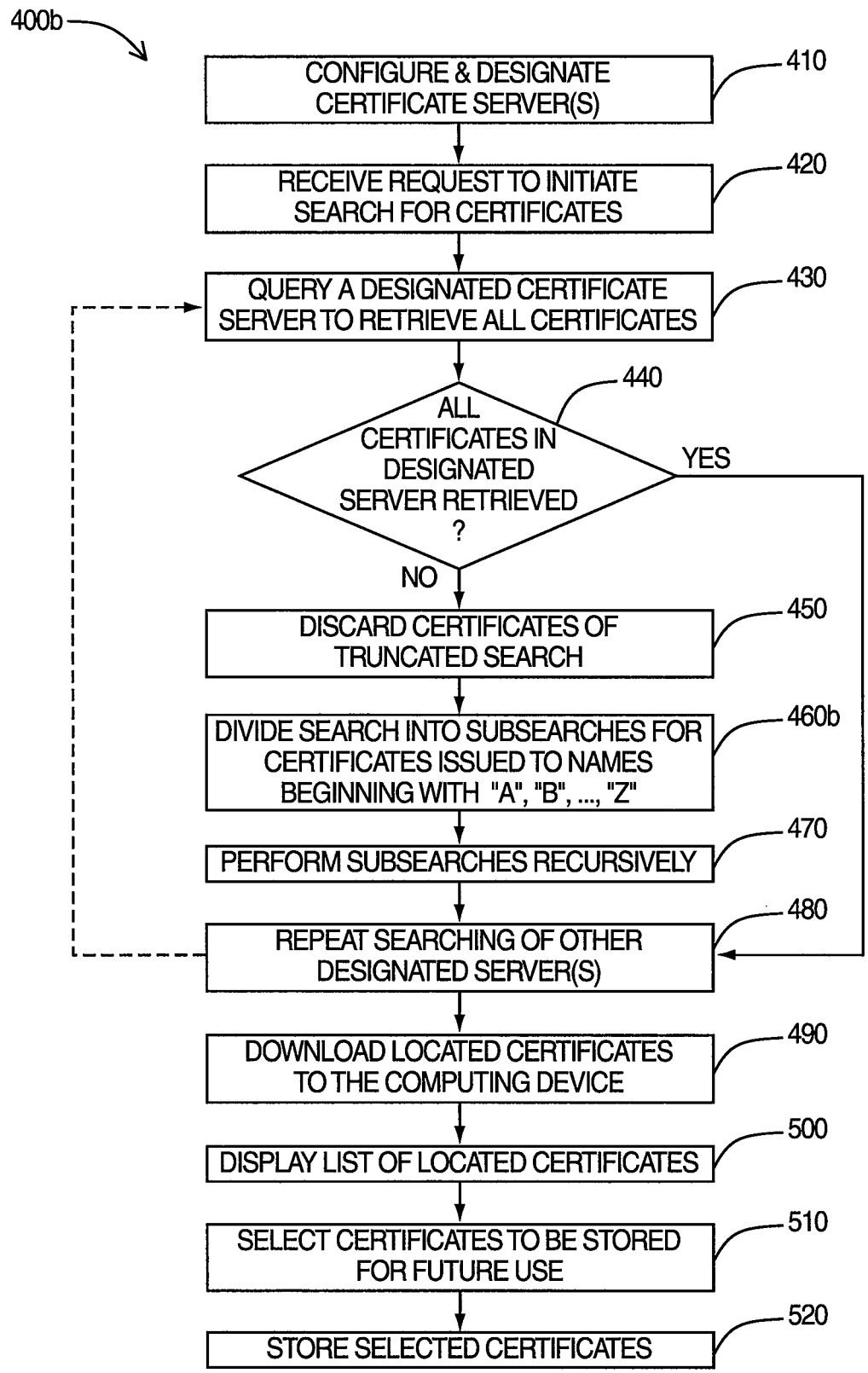
FIG. 7B is a flowchart illustrating steps in a method of searching and retrieving certificates in another example embodiment.

Referring to FIG. 7B, a flowchart illustrating steps in a method of searching and retrieving certificates in another example embodiment is shown generally as 400b. Method 400b is similar to method 400, except that this embodiment is directed to a specific algorithm used in the certificate search.

If at step 440, it is determined that not all certificates stored on the designated certificate server searched at step 430 were successfully located and retrieved, the search is divided into multiple subsearches at step 460b. Specifically, the search is divided into a subsearch for certificates issued to individuals with names beginning with "A", a subsearch for certificates issued to individuals with names beginning with "B", a subsearch for certificates issued to individuals with names beginning with "C", and so on, so that subsearches are performed for all names beginning with letters "A" through "Z". Additional subsearches or modification of the queries used may be necessary to accommodate situations where the data may be case-sensitive. Additional subsearches may also be performed to search for certificates having names that may begin with numeric or special characters. In one example embodiment, the last name attribute may be searched for this purpose, but alternatively, other name attributes (e.g. first name) may instead be used. In variant embodiments, other fields other than name fields may be similarly searched.

The subsearches are then performed recursively at step 470 through corresponding queries of the designated certificate server. For example, if the subsearch for certificates issued to individuals with names beginning with "A" was not successful, possibly due to a limit on the number of potential search results being exceeded, the certificate synchronization application will then divide this subsearch into further subsearches to be performed. The subsearch can be divided into a subsearch for certificates issued to individuals with names beginning with "AA", a subsearch for certificates issued to individuals with names beginning with "AB", a subsearch for certificates issued to individuals with names beginning with "AC", and so on, so that subsearches are performed for all names beginning with letters "AA" through "AZ". Each of these subsearches, if unsuccessful, may be divided into further subsearches, extending each prefix by a letter at each level of recursion. Any truncated results of unsuccessful subsearches may be optionally discarded. A maximum limit on the prefix length (and thus the number of levels of recursion) may be defined and enforced by the certificate synchronization application. This limit may be established by an IT administrator, in accordance with an IT policy, for example.

With respect to methods of searching and retrieving certificates in embodiments described herein, subsearches may be performed sequentially or concurrently, depending on the particular implementation. The ability to perform subsearches concurrently may depend on the particular computing device on which the certificate synchronization application executes and/or on the ability of a given certificate server to handle multiple queries from the application simultaneously.

The steps of a method of searching and retrieving certificates in embodiments described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method for searching and retrieving certificates comprising:
    at a mobile device, requesting a search for a plurality of certificates on a certificate server remote from the mobile device, wherein at least one query is submitted to the certificate server to request retrieval of the plurality of certificates;
    receiving an indication at the mobile device that some but not all of the plurality of certificates are located for retrieval due to a quota on the number of search results being exceeded at the certificate server;
    in response to the receiving, the mobile device requesting a further search on the certificate server by
    dividing the search into a plurality of subsearches,
    requesting the subsearches on the certificate server, wherein at least one query is submitted from the mobile device to the certificate server for each subsearch, wherein the certificate server provides for retrieval of at least a subset of the plurality of certificates based on results of the subsearches,
    downloading the at least a subset of the plurality of certificates to the mobile device; and
    generating a list of certificates identifying one or more certificates downloaded to the mobile device, wherein the one or more certificates downloaded to the mobile device comprise the at least a subset of the plurality of certificates.

2. The method of claim 1, further comprising storing the list of certificates in one or more certificate stores on the mobile device.

3. The method of claim 1, wherein said method is performed by a certificate synchronization application executing and residing on the mobile device.

4. The method of claim 1, further comprising displaying the list of certificates; and receiving user selections of one or more selected certificates identified in the list.

5. The method of claim 2, further comprising filtering out duplicate downloaded certificates prior to storing the at least a subset of certificates in the one or more certificate stores on the mobile device.

6. The method of claim 1, wherein the one or more certificate servers comprises one or more Lightweight Directory Access Protocol servers.

7. The method of claim 1, wherein each of the plurality of subsearches comprises a search for certificates issued to names beginning with one of a plurality of prefixes.

8. The method of claim 7, wherein each of the plurality of prefixes includes only alphabetic characters.

9. The method of claim 8, wherein each of the plurality of subsearches corresponds to a letter of the alphabet.

10. The method of claim 8, wherein each of the plurality of subsearches corresponds to two or more letters of the alphabet.

11. A non-transitory computer-readable medium comprising a plurality of instructions, which, when executed by a processor of a mobile device, cause the processor to perform a method of searching and retrieving certificates comprising:
    requesting a search for a plurality of certificates on a certificate server remote from the mobile device, wherein at least one query is submitted to the certificate server to request retrieval of the plurality of certificates;
    receiving an indication at the mobile device that some but not all of the plurality of certificates are located for retrieval due to a quota on the number of search results being exceeded at the certificate server;
    in response to the receiving, requesting a further search on the certificate server by dividing the search into a plurality of subsearches,
    requesting the subsearches on the certificate server, wherein at least one query is submitted from the mobile device to the certificate server for each subsearch, wherein the certificate server provides for retrieval of at least a subset of the plurality of certificates based on results of the subsearches,
    downloading the at least a subset of the plurality of certificates to the mobile device;
    generating a list of certificates identifying one or more certificates downloaded to the mobile device, wherein the one or more certificates downloaded to the mobile device comprise the at least a subset of the plurality of certificates.

12. A mobile device, the mobile device comprising a memory, a communication subsystem and a processor, the processor configured to:
    request, via the communication subsystem, a search for a plurality of certificates on a certificate server remote from the mobile device, wherein at least one query is submitted to the certificate server to request retrieval of the plurality of certificates;
    receive an indication at the mobile device, that some but not all of the plurality of certificates are located for retrieval due to a quota on the number of search results being exceeded at the certificate server;
    in response to receiving the indication that some but not all of the plurality of certificates are located for retrieval due to the quota on the number of search results being exceeded at the certificate server, request a further search on the certificate server by dividing the search into a plurality of subsearches,
    requesting the subsearches on the certificate server, wherein at least one query is submitted from the mobile device to the certificate server for each subsearch, wherein the certificate server provides for retrieval of at least a subset of the plurality of certificates based on results of the subsearches,
    downloading the at least a subset of the plurality of certificates to the memory of the mobile device;
    generate a list of certificates identifying one or more certificates downloaded to the mobile device, wherein the one or more certificates downloaded to the mobile device comprise the at least a subset of the plurality of certificates.

13. The mobile device of claim 12, wherein the processor is further configured to store the list of certificates transmitted to the mobile device in one or more certificate stores on the mobile device.

14. The mobile device of claim 12, wherein the processor is further configured to display the list of certificates; and receive user selections of one or more selected certificates identified in the list.

15. The mobile device of claim 13, wherein the processor is further configured to filter out duplicate downloaded certificates prior to storing the at least a subset of certificates in the one or more certificate stores on the mobile device.

16. The mobile device of claim 12, wherein the one or more certificate servers comprises one or more Lightweight Directory Access Protocol servers.

17. The mobile device of claim 12, each of the plurality of subsearches comprises a search for certificates issued to names beginning with one of a plurality of prefixes.

18. The mobile device of claim 17, wherein each of the plurality of prefixes includes only alphabetic characters.

19. The mobile device of claim 18, wherein each of the plurality of subsearches corresponds to a letter of the alphabet.

20. The mobile device of claim 18, wherein each of the plurality of subsearches corresponds to two or more letters of the alphabet.

* * * * *